United States Patent
Adams et al.

(10) Patent No.: US 6,662,539 B1
(45) Date of Patent: Dec. 16, 2003

(54) CROP HARVESTING MACHINE WITH SIDE DISCHARGE DIRECTED REARWARD

(75) Inventors: Richard K. Adams, East Earl, PA (US); Douglas S. Fitzkee, Ephrata, PA (US)

(73) Assignee: New Holland North America, Inc., New Holland, PA (US)

( * ) Notice: Subject to any disclaimer, the term of this patent is extended or adjusted under 35 U.S.C. 154(b) by 0 days.

(21) Appl. No.: 10/223,944

(22) Filed: Aug. 20, 2002

(51) Int. Cl.$^7$ .......................... A01D 57/30; A01D 43/00
(52) U.S. Cl. ........................................... 56/192; 56/158
(58) Field of Search .................... 56/15.7, 192, 378, 56/16.6, 158, 160, 189, 219, 264, DIG. 21

(56) References Cited

U.S. PATENT DOCUMENTS

| | | | | |
|---|---|---|---|---|
| 3,717,981 A | * | 2/1973 | van der Lely | 56/6 |
| 3,721,080 A | * | 3/1973 | Marsh | 56/364 |
| 4,022,005 A | | 5/1977 | Case | 56/372 |
| 4,099,364 A | * | 7/1978 | Kanengieter et al. | 56/16.4 C |
| 4,198,803 A | * | 4/1980 | Quick et al. | 56/296 |
| 4,392,339 A | | 7/1983 | Berlivet et al. | 56/192 |
| 4,458,697 A | * | 7/1984 | James | 460/74 |
| 4,465,081 A | * | 8/1984 | Decoene et al. | 460/98 |
| 4,473,993 A | | 10/1984 | Jennings et al. | 56/208 |
| 4,757,672 A | * | 7/1988 | Roger | 56/192 |
| 4,910,951 A | | 3/1990 | Reilly et al. | 56/376 |
| 5,203,154 A | * | 4/1993 | Lesher et al. | 56/366 |
| 5,943,848 A | * | 8/1999 | Rice et al. | 56/16.4 B |
| 6,145,289 A | | 11/2000 | Welsch et al. | 56/192 |

* cited by examiner

Primary Examiner—Robert E. Pezzuto
Assistant Examiner—Alicia Torres
(74) Attorney, Agent, or Firm—John William Stader; Collin A. Webb; Brant T. Maurer

(57) ABSTRACT

The apparatus is a crop harvesting machine with a header that discharges the crop toward the rear of the machine at the edge of the area harvested. A transverse auger conveyor moves the cut crop to one side of the machine where rotating paddles attached to the auger conveyor center tube push the cut crop out toward the rear through a discharge opening that defines the windrow being formed.

12 Claims, 2 Drawing Sheets

CROP HARVESTING MACHINE WITH SIDE DISCHARGE DIRECTED REARWARD

BACKGROUND OF THE INVENTION

This invention deals generally with crop harvesting machines, such as mowers, mower-conditioners, and windrowers, and more specifically with a rear discharge header with an auger conveyor that transports the crop to one side of the header where it is discharged toward the rear of the machine.

It is well established that one way to reduce the subsequent work on a harvested field is to pass the crop mower or mower-conditioner in opposite directions for successive cuts, but to always discharge the crop from one side of the mower. This pattern of cutting produces what is known as double windrows, that is, two side by side windrows.

There are several patents which disclose such machines. U.S. Pat. No. 4,022,005 by Case describes a double windrowing machine that uses multiple parallel belts to move the crop to one side of the machine where it is discharged. The belts have lugs to engage the crop and finger-like strippers are mounted at the discharge end of the belts to assure that the crop is removed from the lugs. However, conveyor belts have problems associated with their structure. It is well known that conveyor belts require frequent maintenance. They have problems in tracking on their drive systems, and for crop mowers, they do not function well under widely different crop conditions.

U.S. Pat. No. 4,392,339 to Berlivet et al uses a more reliable auger conveyor to move crop from its usual center discharge location to a location on one side of the machine, and takes the auger conveyor out of service on alternate passes through the crop by raising it into a vertical position. Berlivet's side discharge auger conveyor shoots the crop straight out the side of the machine, and the location and width of the resulting windrow is highly dependent upon the crop characteristics.

It would be very beneficial to have a reliable side discharge system for a crop mower that would lay down a windrow of predictable width and in a predictable location regardless of the condition of the crop itself.

SUMMARY OF THE INVENTION

The present invention uses an auger conveyor to accept cut crop material from all along the cutting unit, move it to one side of the header, and discharge it rearward in a well defined windrow outside the track of the wheels of the propelling vehicle. This action is accomplished by the use of an auger conveyor with unidirectional flow across the width of the header, with paddles mounted on the auger conveyor center tube at the discharge end of the auger conveyor and with the paddles and a rear discharge opening located beyond the track of the vehicle wheel. The rotating paddles then discharges the crop beside the vehicle wheel, but actually discharges the crop rearward, and the width of the discharge opening for the paddle determines the width of the resulting windrow regardless of the crop condition.

The invention also includes other features that improve the performance of the rear discharge conveyor. One feature is that rather than using the conventional auger pitch of 1.0; which is used in most crop auger conveyors, the present invention is designed with a pitch of 1.5. Thus, instead of moving the crop material the distance of one auger diameter for each revolution of the auger conveyor, the invention moves the material 1½ times the diameter of the auger conveyor for every revolution. The faster displacement of the crop material prevents clogging of the auger conveyor with heavier crop material. The auger flighting can also be single or double, and, in fact, two flighting sets are desirable.

The another feature of the invention that improves performance is the use of a smaller center tube diameter for the paddle section of the rear discharge apparatus than for the auger conveyor section. For the rotating paddles to change the direction of and discharge crop material as fast as the auger conveyor feeds it into the paddle section, particularly with heavier crop material, it is beneficial for the center tube at the discharge to be smaller than the size of the auger conveyor center tube in order to accommodate the volume of crop of the full width of the cut. Therefore, for rear discharge units that are used with adverse crop conditions, as opposed to enlarging the auger conveyor trough to accommodate larger crop volume, the paddle section of the rear discharge apparatus is constructed with a smaller diameter center tube than the auger conveyor section. For the preferred embodiment, the auger conveyor section has a center tube diameter of 10 inches and the flights have outside diameters of 20 inches, while the paddles are mounted on a 5 inch diameter center tube and extend to the same 20 inch diameter as the flights. This configuration permits the trough for the auger conveyor section to extend over the paddle section with no discontinuity.

There are also two features of the present invention that permit adjustment of the width of the windrow produced. It is very desirable to maintain the outer edge of the windrow at a reasonable distance from the edge of the cut crop, and more importantly, from the boundary of the crop that will be cut later. If the windrow were located at the very edge of the uncut crop, the machine operator would have a difficult time preventing pickup of some of the windrow, and this can cause fouling of the crop cutting mechanism. The best arrangement is to have the windrow deposited somewhat inboard from the edge of the area of the cut. Such a location provides leeway for the machine operator to cut the standing crop but avoid the windrow. However, as with so many aspects of mowers, the motion imparted to the cut crop varies with the type of crop and with its moisture content, thus making it difficult to use permanently fixed structures to control the placement of the windrow.

The present invention includes an angularly adjustable swathboard protruding rearward and pivoting at the outboard sideshield of the header. This angled swathboard can narrow the crop flow path as the crop is discharged out the rear discharge opening by the paddle. The adjustable angle permits the swathboard to be oriented in a range from almost straight back to a significant angle, and thereby the windrow can be deposited at any desirable spacing from the uncut crop.

There is another very simple adjustment available at the inboard side of the rear discharge window that is used to reduce the width of the deposited windrow when crop conditions require it. To accomplish the reduction of windrow width there is added to the auger conveyor trough an additional section of sheet metal to close off part of the rear discharge opening. This additional section is shaped with the same curve as the auger trough to which it is bolted and is easily added or removed as needed.

The present invention thereby provides a reliable rear discharge crop header, that not only discharges varying condition crop material at the edge of the cut crop area, but also produces a neatly shaped windrow, with no scattering regardless of crop condition, to facilitate complete pickup of the side by side double windrow.

DETAILED DESCRIPTION OF THE INVENTION

Figure 1:
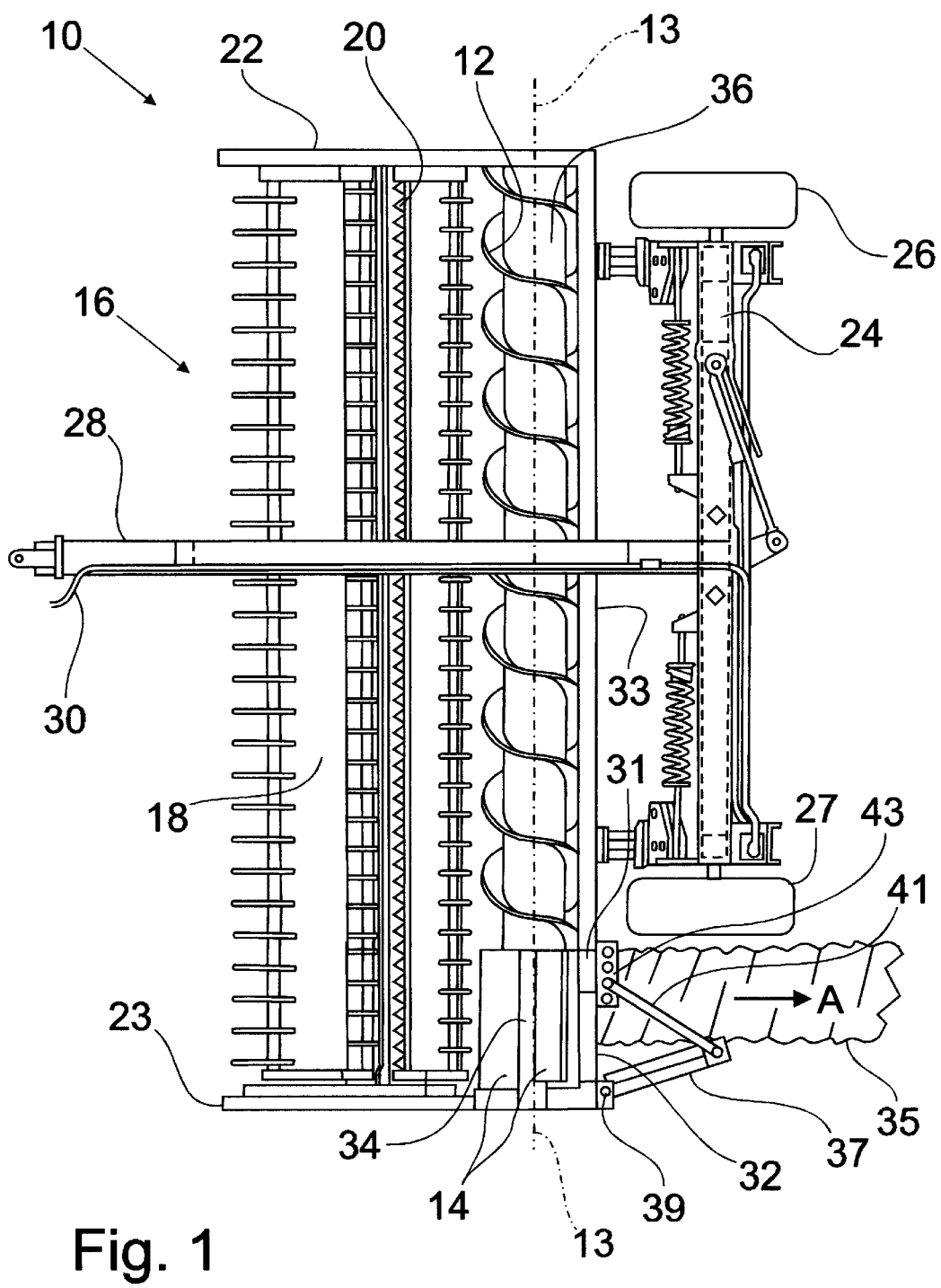
FIG. 1 is a top plan view of the preferred embodiment of the invention showing the full width unidirectional auger conveyor and the discharge paddles.

FIG. 1 is a top plan view of the preferred embodiment of the invention showing a typical crop harvesting machine 10 with the top panel removed for better viewing of the internal parts. The particular machine shown in FIG. 1 is known as a pivot tongue windrower, and is intended to be towed behind a tractor or similar. vehicle. However, the rear discharge header of the present invention can also be installed directly upon self propelled mowers or mower-conditioners and yield the same benefits.

Machine 10 differs from a conventional crop harvesting machine in that it has full width unidirectional auger conveyor 12 and rotating discharge paddles 14 mounted within a typical header 16 that also includes conventional reel 18 and conventional cutterbar 20. It should be appreciated that since cutterbar 20 is not part of the invention claimed, other cutting devices, such as disc cutters, can also be used in conjunction with the present invention.

Header 16 has side sheets 22 and 23, and header 16 is connected to main frame 24 of crop harvesting machine 10 that includes wheels 26 and 27 and longitudinally extending towing bar 28. Header 16 is connected to main frame 24 in a conventional manner that permits some angular vertical movement relative to main frame 24. Power for the operation of auger conveyor 12, reel 18, and cutterbar 20 is transferred to header 16 from the towing vehicle through hydraulic line 30, but, clearly, the components within header 16 can also be powered electrically or mechanically, and different but appropriate transfer means would then be used. Header 16, reel 18, and cutterbar 20 are, in fact, conventional and well established devices. It is auger conveyor 12 and paddles 14 that make crop harvesting machine 10 different.

Typically, the conventional type of auger conveyor occupying the location of auger conveyor 12 is constructed wvith two types of flights that move the cut crop which is fed to the auger conveyor to the center of crop harvesting machine 10. From that machine center location the cut crop is discharged onto the ground to form a windrow in the center of the area which the machine has just harvested. Since center discharged single windrows require the following machine, such as a baler, to pick up one windrow at a time, there is a distinct advantage to making double windrows. In fact, double windrows halve the number of passes the following machine must make to pick up the windrows.

A rear discharge machine such as crop harvesting machine 10 forms double windrows by discharging the crop at the very edge of the area just harvested. Thus, when the next cut is made with the harvesting machine adjacent to the prior cut but traveling in the opposite direction, a second windrow is laid down next to the first windrow.

Auger conveyor 12 is unidirectional and moves the cut crop to one side of harvesting machine 10, toward the bottom of FIG. 1. However, auger conveyor 12 ends before it reaches side sheet 23, and in the portion of header 16 which extends beyond wheel 27, auger conveyor 12 is replaced with rotating paddles 14. Paddles 14, rotating on the same axis of rotation 13 as auger conveyor 12, push the cut crop out discharge opening 32 in direction A, rearward relative to the movement of crop harvesting machine 10, to form windrow 35. Discharge opening 32 is located adjacent to one end of auger conveyor trough 33.

A significant advantage of the present invention is that discharge opening 32 determines the width of the windrow laid down regardless of the condition of the harvested crop. The predetermined width of the windrow produced by the preferred embodiment of the invention is preferable to prior art auger conveyors that discharge crop out the end of the auger conveyor and parallel to its axis. Such a prior art auger conveyor will propel crop material varying distances depending upon the crop's weight and moisture content, and make the resulting windrows inconsistent in their width. This makes the subsequent task of picking up the windrows more difficult.

To further facilitate forming the double windrows produced by the present invention, the preferred embodiment includes angularly adjustable swathboard 37 extending rearward from the outboard edge of crop discharge opening 32 and pivoting at pivot point 39 on sideshield 23 of header 16. If windrow 35 were discharged at the very edge of the area of cut crop, the machine operator would have a difficult time preventing pickup of some of the windrow while cutting the adjacent area. This can cause fouling of the crop cutting mechanism. However, when windrow 35 is deposited somewhat inboard from the edge of the area of the cut it provides leeway for the machine operator to cut the standing crop but avoid the windrow.

Angled swathboard 37 deflects the discharging crop away from the edge of the cut area as the crop is discharged out rear discharge opening 32 by paddles 14. Furthermore, its adjustable angle permits swathboard 37 to be oriented in a range from almost straight back to a significant angle, and thereby windrow 35 can be deposited at any desirable spacing from the edge of the cut crop area regardless of the crop condition.

The angular adjustment of swathboard 37 is accomplish by adjustment rod 41 which has one end attached near the end of swathboard 37 and the other end inserted into any one of an array of holes on fixture 43. As the end of rod 41 is moved from hole to hole, the angle of swathboard 37 relative to crop discharge direction A changes to deflect the crop farther from or closer to the edge of the cut crop area.

In order to improve the performance of the invention for heavier crop material the preferred embodiment also includes a larger pitch than is conventionally used for crop auger conveyors. While the conventional pitch is 1.0, the present invention is designed with a pitch of 1.5. Thus, instead of moving the crop material the distance of one auger diameter for each revolution of auger conveyor 12, the present invention moves the material 1½ times the diameter of auger conveyor 12 for every revolution.

Another feature of the invention that improves performance is the use of a smaller center tube diameter for rotating paddles 14 than for the center tube diameter for auger conveyor 12. Since rotating paddles 14 must change the direction of the crop as super conveyor 12 feeds the crop to paddles 14 it is possible, particularly with heavier crop material, that paddles 14 will not discharge the crop material fast enough, and the paddles will clog up. This problem can be avoided by reducing the center tube diameter or by increasing the height of the paddles, thus increasing the discharge area. However, significant structural complexity is required to make paddles 14 larger than the outside diameters of the auger flights. Therefore, for paddles that may be used under adverse crop conditions, as opposed to making paddles which extend beyond the height of the auger flights, paddles 14 are mounted on center tube 34 that is an extension of auger conveyor center tube 36 but has a smaller diameter. For the preferred embodiment, auger center tube 36 has a diameter of 10 inches and auger conveyor 12 has an outside diameter of 20 inches, while paddles 14 are mounted on 5 inch diameter center tube 34 and the paddles can extend to the same 20 inch diameter as the auger conveyor. The embodiment of the invention shown in FIG. 1 has an overall cutting width of 16 feet, 8 inches, and discharge opening 32 is adjustable from 36 inches to 48 inches wide. This adjustment is accomplished quite simply by the attachment of removable panel 31 to the inboard edge of rear discharge opening 32. Removable panel 31 is simply bolted to auger conveyor trough 33, and its location is shown in FIG. 1 with a dashed line.

Figure 2:
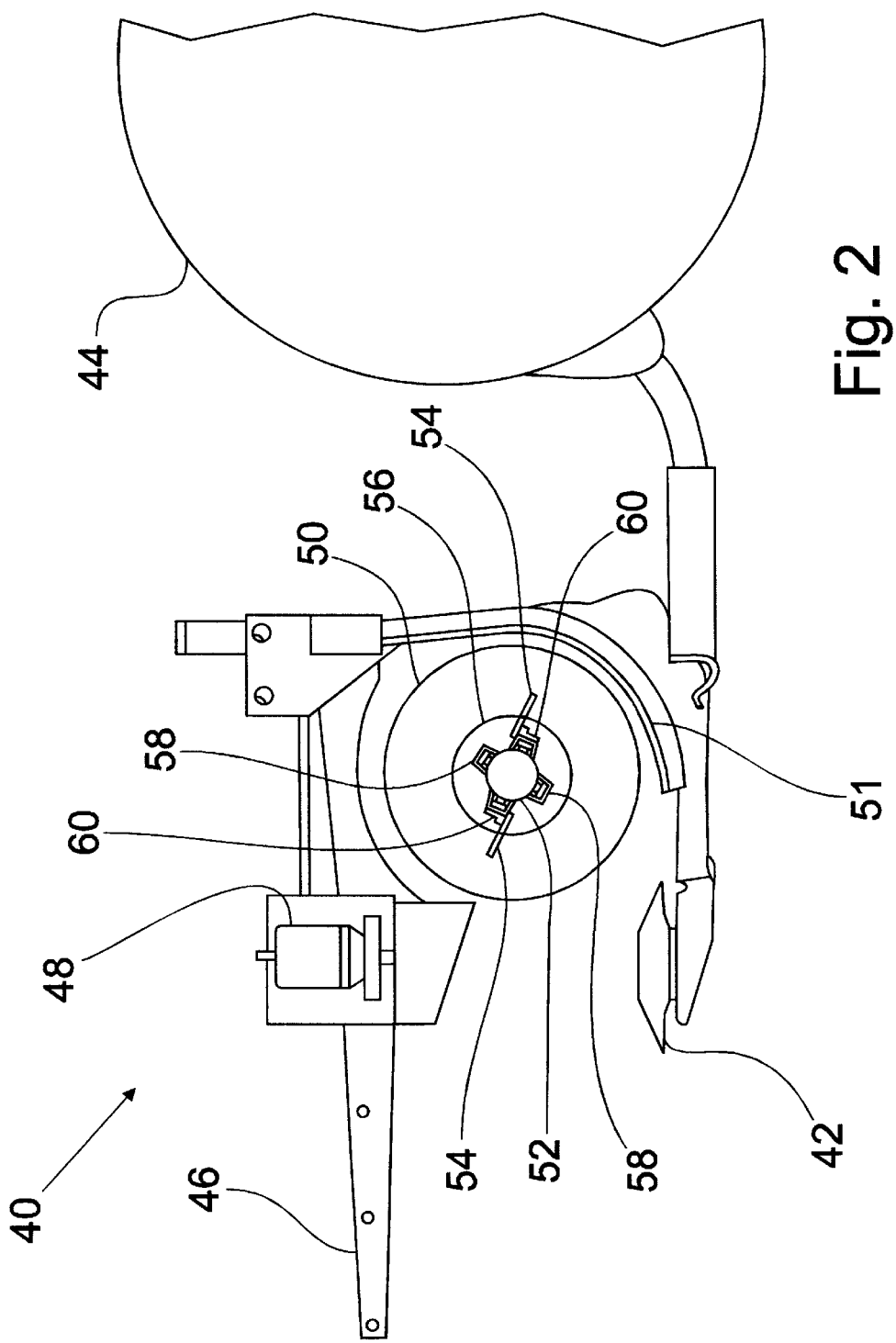
FIG. 2 is a simplified side view of another embodiment of the invention installed in a harvesting machine that uses disc cutters rather than the cutter bar shown in FIG. 1.

FIG. 2 is a simplified side view of another embodiment of the invention installed in harvesting machine 40 that uses a transversely oriented array of disc cutters 42 rather than the cutter bar shown in FIG. 1. In FIG. 2 the conventional side shield and its supporting structure that usually blocks the access to the components seen in FIG. 2 has been removed for better viewing. Only portions of wheel 44 and frame 46 of harvesting machine 40 are shown along with top shield framework 46. These components are all conventional structures and well known in the art. Hydraulic motor 48 is also a conventional component for harvesting machines. It is used to drive both disc cutters 42 and auger conveyor 50 through mechanical drive trains (hot shown) which are also conventional and well known.

The structures of auger conveyor 50 and trough 51 of FIG. 2 are the same as that of auger conveyor 12 and trough 33 of FIG. 1, and, similarly, as in the embodiment of FIG. 1, paddle center tube 52 to which paddles 54 are attached is smaller than auger conveyor center tube 56. However, FIG. 2 shows a structure by which paddles 54 can be attached to paddle center tube 52. Channels 58 are attached to paddle center tube 52, typically by welding, and "L" brackets 60 to which paddles 54 are attached are then bolted to channels 58.

As can be seen in FIG. 2 paddles 54 do not extend to the full diameter of auger conveyor 50. Thus, if crop conditions require it, longer paddles can be installed to replace paddles 54. It is also obvious from FIG. 2 that all the channels 58 are not being used to hold paddles 54. The use of only two paddles is satisfactory for many crop conditions, but, if desirable, two more paddles can be attached to paddle center tube 52.

The present invention thereby furnishes a versatile crop harvesting machine with a rear discharge that produces well defined windrows under varying crop conditions and lays the windrows at the edge of the cut area to facilitate double rows and subsequent processing.

It is to be understood that the form of this invention as shown is merely a preferred embodiment. Various changes may be made in the function and arrangement of parts; equivalent means may be substituted for those illustrated and described; and certain features may be used independently from others without departing from the spirit and scope of the invention as defined in the following claims.

For example, The invention can be constructed with either side of a machine used for discharge. Furthermore, auger conveyor 12 and paddles 14 within header 16 can be powered by any conventional means, such as mechanical coupling to the basic machine or electrical or hydraulic motors.

What is claimed as new and for which Letters patent of the United States are desired to be secured is:

1. In a crop harvesting machine having a frame with a wheel on each side of the frame so that the crop harvesting machine is adapted for movement in a field, with the crop harvesting machine having a crop harvesting header mounted on the frame, the improvement comprising:

said header including a transversely extending single cutting apparatus for cutting standing crop from the field to initiate the crop harvesting process and also including a transversely extending elongate unidirectional auger conveyor, with auger flights thereon, mounted within a trough to receive the cut crop from the cutting apparatus and to discharge the cut crop from a discharge end of the auger convevor that is located at one side of the crop harvesting machine, said trough comprising a transverse generally elongate U-shaped member extending substantially the full length of, and partially enclosing said auger conveyor with the open portion of said U-shaped member facing generally upwardly and forwardly with respect to the movement of the crop harvesting machine;

rotating paddles located at the discharge end of the auger conveyor with the paddles located beyond the wheel of the crop harvesting machine at the discharge end of the auger conveyor;

said rotating paddles and said auger conveyor attached to a single center tube for rotational support therewith; and a crop discharge opening located at the rear of said auger conveyor trough so that the cut crop is engaged and pushed by the paddles through the crop discharge opening rearward relative to movement of the crop harvesting machine and fully beyond the wheel of the crop harvesting machine.

2. The crop harvesting machine of claim 1 wherein the portion of the center tube to which the paddles are attached has a smaller diameter than the portion of the center tube occupied by the auger conveyor, the outermost portions of the paddles defining a cylinder with substantially the same diameter as the auger conveyor.

3. The crop harvesting machine of claim 2 wherein the pitch of the auger conveyor is 1.5.

4. The crop harvesting machine of claim 3 wherein the cutting apparatus is a cutterbar.

5. The crop harvesting machine of claim 3 wherein the cutting apparatus is an array of disc cutters.

6. The crop harvesting machine of claim 4 further including an angularly adjustable swathboard extending rearward from the outboard edge of the crop discharge opening to selectively determine where the cut crop is deposited on the ground relative to the wheel.

7. The crop harvesting machine of claim 1 wherein said auger conveyor is formed with a transversely extending center tube defining an axis of rotation for said auger conveyor, said center tube at said discharge end having a reduced diameter portion compared to the diameter of said center tube outside of said discharge area.

8. The crop harvesting machine of claim 7 wherein said paddles are mounted on said reduced diameter portion of said auger conveyor center tube.

9. The crop harvesting machine of claim 8 wherein said auger flighting is affixed to said center tube outside of said discharge area, said flighting defining an overall diameter of said auger conveyor, said paddles defining a substantially equal diameter as said overall diameter of auger conveyor.

10. The crop harvesting machine of claim 9 wherein said auger conveyor flighting is mounted on said center tube at a pitch greater than 1.0.

11. The crop harvesting machine of claim 10 further including an angularly adjustable swathboard extending rearward from the outboard edge of the crop discharge opening to selectively determine where the cut crop is deposited on the ground relative to the wheel.

12. The crop harvesting machine of claim 1 further including a removable panel extending from an edge of the crop discharge opening and reducing the size of the crop discharge opening.

* * * * *